US012464206B1

(12) United States Patent
Agrawal et al.

(10) Patent No.: US 12,464,206 B1
(45) Date of Patent: Nov. 4, 2025

(54) ADAPTIVE VIDEO RECAP OF MEDIA CONTENT EPISODES IN AN ELECTRONIC DEVICE

(71) Applicant: MOTOROLA MOBILITY LLC, Wilmington, DE (US)

(72) Inventors: Amit Kumar Agrawal, Bangalore (IN); Krishnan Raghavan, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/762,116

(22) Filed: Jul. 2, 2024

(51) Int. Cl.
*H04N 21/8549* (2011.01)
*H04N 21/24* (2011.01)
*H04N 21/482* (2011.01)

(52) U.S. Cl.
CPC ..... *H04N 21/8549* (2013.01); *H04N 21/2407* (2013.01); *H04N 21/482* (2013.01)

(58) Field of Classification Search
None
See application file for complete search history.

(56) References Cited

U.S. PATENT DOCUMENTS

| | | | | |
|---|---|---|---|---|
| 9,462,230 B1* | 10/2016 | Agrawal | ............... | G06Q 50/20 |
| 9,807,474 B2* | 10/2017 | Gibbon | ............. | H04N 21/8549 |
| 9,860,613 B2* | 1/2018 | Kishore | .......... | H04N 21/47202 |
| 10,462,519 B2* | 10/2019 | Drake | ................ | H04N 21/4667 |
| 10,555,023 B1* | 2/2020 | McCarthy | .......... | H04N 21/8549 |
| 10,693,824 B2* | 6/2020 | Silva | ....................... | H04L 51/04 |
| 10,762,152 B2* | 9/2020 | Oztaskent | ............. | G06F 16/335 |
| 10,917,703 B2* | 2/2021 | Aher | ................... | H04N 21/8456 |
| 2009/0119704 A1* | 5/2009 | Dimitrova | ............... | G11B 27/11 725/38 |
| 2012/0284640 A1* | 11/2012 | Sloyer | .................... | G06Q 10/10 715/753 |
| 2013/0290434 A1* | 10/2013 | Bank | ................... | H04L 12/1822 709/204 |
| 2013/0325972 A1* | 12/2013 | Boston | ................... | G06Q 10/10 709/204 |
| 2014/0320588 A1* | 10/2014 | Midtun | ............... | H04L 12/1895 370/260 |
| 2015/0334472 A1* | 11/2015 | Kishore | ............. | H04N 21/8549 725/32 |
| 2016/0234268 A1* | 8/2016 | Ouyang | .................. | H04L 67/54 |
| 2018/0077099 A1* | 3/2018 | Silva | ..................... | H04L 65/403 |
| 2023/0421867 A1* | 12/2023 | Puniyani | ............... | H04N 21/84 |

* cited by examiner

*Primary Examiner* — James R Marandi
(74) *Attorney, Agent, or Firm* — Isidore PLLC

(57) ABSTRACT

A computing system, a method and a computer program product for presenting a determined optimal duration of video recap of media content. The method includes detecting, via a processor of a computing system, selection of a current episode of media content for playback. In response to detecting selection of the current episode of the media content for playback, the method includes determining a first time difference between a current time and a previous viewing time of prior episodes. The method includes determining, based on the first time difference, a first time duration for a first video recap of the prior episodes of the media content. The method includes streaming the first time duration of the first video recap of the media content for presentation on an electronic device as a preview presented prior to streaming the current episode of the media content for presentation on the electronic device.

20 Claims, 11 Drawing Sheets

Video Recap Modules 266A

| Video Recap A 490 | | | |
|---|---|---|---|
| Title 490A | Time Duration 490B | Episodes 490C | Content 490D |

| Video Recap B 492 | | | |
|---|---|---|---|
| Title 492A | Time Duration 492B | Episodes 492C | Content 492D |

| Video Recap C 494 | | | |
|---|---|---|---|
| Title 494A | Time Duration 494B | Viewed Portion 494C | Content 494D |

| Video Recap D 496 | | | |
|---|---|---|---|
| Title 496A | Time Duration 496B | Viewed Portion 496C | Content 496D |

FIG. 4B

ADAPTIVE VIDEO RECAP OF MEDIA CONTENT EPISODES IN AN ELECTRONIC DEVICE

RELATED APPLICATIONS

This application is related to U.S. application Ser. No. 18/762,056, filed concurrently herewith, the contents of which are incorporated herein by reference.

BACKGROUND

1. Technical Field

The present disclosure generally relates to electronic devices and in particular to video content viewing with recaps presented in an electronic device.

2. Description of the Related Art

Electronic devices, such as mobile phones, tablets, and laptops, are widely used for video, voice, and text communication and for data transmission. Electronic devices are also frequently used to view media content such as video, movies and television shows. A video recap is a video sequence of scenes from one or more previous episodes with a narrative that is used to bring a viewer up to date with the current events of the plot of a story, so the viewer can understand from where the current episode will begin. A video recap serves to lay the background for the following episode and is pre-generated and stored as a part of the recorded episode.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 4B is an example block diagram illustrating details of several video recaps, according to one or more embodiments;

DETAILED DESCRIPTION

Figure 1:
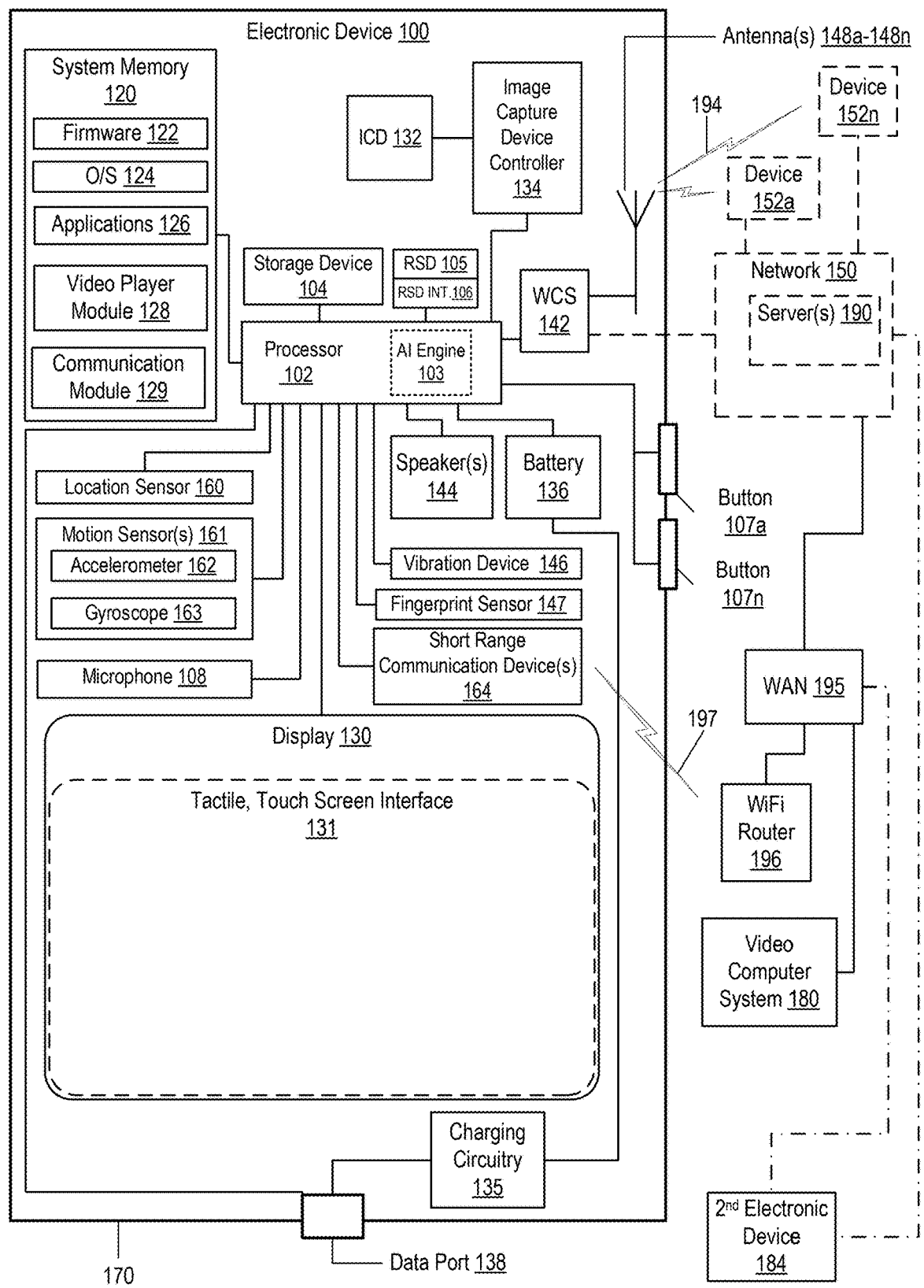
FIG. 1 depicts an example electronic device within which various aspects of the disclosure can be implemented, according to one or more embodiments.

According to one or more aspects of the disclosure, the illustrative embodiments provide a computing system, a method, and a computer program product for selectively determining and presenting an optimal duration of video recap of media content. In a first embodiment, a computing system includes a communications subsystem and a memory having stored thereon an adaptive video recap module for configuring the computing system to selectively present a determined optimal duration of video recap of media content. The computing system includes at least one processor that is communicatively coupled to the communications subsystem and the memory. The at least one processor executes program code of the adaptive video recap module. The at least one processor is configured to cause the computing system to detect selection of a current episode of first media content for playback. The first media content is presented sequentially within a plurality of episodes that includes one or more prior episodes that precede the current episode being initiated for playback. In response to detecting selection of the current episode of the first media content for playback, the at least one processor determines a first time difference between a current time and a previous viewing time of the one or more prior episodes. The at least one processor determines, based on the first time difference, at least a first time duration for a first video recap of at least one of the one or more prior episodes of the first media content. The at least one processor streams the first time duration of the first video recap of the first media content for presentation on an electronic device as a preview presented prior to streaming the current episode of the first media content for presentation on the electronic device.

According to another embodiment, the method includes detecting, via a processor of a computing system, selection of a current episode of first media content for playback. The first media content is presented sequentially within a plurality of episodes that includes one or more prior episodes that precede the current episode being initiated for playback. In response to detecting selection of the current episode of the first media content for playback, the method includes determining a first time difference between a current time and a previous viewing time of the one or more prior episodes. The method includes determining, based on the first time difference, at least a first time duration for a first video recap of at least one of the one or more prior episodes of the first media content. The method includes streaming the first time duration of the first video recap of the first media content for presentation on an electronic device as a preview presented prior to streaming the current episode of the first media content for presentation on the electronic device.

According to an additional embodiment, a computer program product includes a computer readable storage device having stored thereon program code that, when executed by at least one processor of a computing system having a communications subsystem, the program code enables the computing system to complete the functionality of the above-described method processes.

According to one or more additional aspects of the disclosure, the illustrative embodiments provide a computing system, a method, and a computer program product for selectively determining and presenting an optimal duration of video recap of partially-viewed media content. In a first embodiment, a computing system includes a communications subsystem and a memory having stored thereon an adaptive video recap module for configuring the computing system to selectively present a determined optimal duration of video recap of partially-viewed media content. The computing system includes at least one processor that is communicatively coupled to the communications subsystem and the memory. The at least one processor executes program code of the adaptive video recap module. The at least one processor is configured to cause the computing system to detect selection of a first media content for initiation of playback at a present viewing time. The at least one processor identifies that the playback is a continuation of a previous playback of a first portion of the first media content from a previous viewing time. The at least one processor determines an elapsed time between the previous viewing time and the present viewing time of the first media content. The at least one processor determines a first video recap time duration for providing an optimal time length of a first video recap of the first portion of the first media content. The first video recap time duration is based on a value of the elapsed time. The at least one processor presents the first video recap having the determined first video recap time duration prior to initiating playback of a remaining portion of the first media content.

According to another embodiment, the method includes detecting, via a processor of a computing system, selection of first media content for initiation of playback at a present viewing time and identifying that the playback is a continuation of a previous playback of a first portion of the first media content from a previous viewing time. The method includes determining an elapsed time between the previous viewing time and the present viewing time of the first media content. The method includes determining a first video recap time duration for providing an optimal time length of a first video recap of the first portion of the first media content, the first video recap time duration based on a value of the elapsed time. The method includes presenting the first video recap having the determined first video recap time duration prior to initiating playback of a remaining portion of the first media content.

According to an additional embodiment, a computer program product includes a computer readable storage device having stored thereon program code that, when executed by at least one processor of a computing system having a communication subsystem, the program code enables the computing system to complete the functionality of the above-described method processes.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts an example electronic device 100 within which various aspects of the disclosure can be implemented, according to one or more embodiments. Examples of such electronic devices include, but are not limited to, mobile devices, a notebook computer, a mobile phone, a digital camera, a smart watch, a tablet computer, and a communication device, etc. It is appreciated that electronic device 100 can be other types of devices that include the capability to transmit and receive communications. Electronic device 100 includes processor 102, which is communicatively coupled to storage device 104, system memory 120, input devices, (introduced below), output devices, such as display 130, and image capture device (ICD) controller 134. Processor 102 can include processor resources such as a primary processing unit (CPU) that support computing, classifying, processing and transmitting of data and information. Processor 102 can further include graphic processing units (GPU) and digital signal processors (DSP) that also support computing, classifying, processing and transmitting and receiving of data and information. Processor 102 can further include a hardware based artificial intelligence (AI) engine 103. AI engine 103 accelerates artificial intelligence, natural language processing (NLP), context evaluation (CE), and machine learning applications. AI engine 103 can also be implemented as a software module, in one embodiment.

System memory 120 may be a combination of volatile and non-volatile memory, such as random access memory (RAM) and read-only memory (ROM). System memory 120 can store program code and data associated with firmware 122, an operating system 124, applications 126, video player module 128, and communication module 129. Video player module 128 includes program code that is executable by processor 102, which configures electronic device 100 to receive and play media content such as videos, movies and television shows. Communication module 129 includes program code that is executed by processor 102, and which configures the processor to cause electronic device 100 to communicate with other external devices and systems.

Although depicted as being separate from applications 126, video player module 128, and communication module 129 may each be implemented as an application. Processor 102 loads and executes program code stored in system memory 120, including program code associated with applications 126 and program code associated with video player module 128, and communication module 129. When processed/executed by processor 102, the program code configures the processor to cause electronic device 100 to provide the various functionality described herein.

In one or more embodiments, electronic device 100 includes removable storage device (RSD) 105, which is inserted into an RSD interface 106 that is communicatively coupled via system interlink to processor 102. In one or more embodiments, RSD 105 is a non-transitory computer program product or computer readable storage device. In one or more embodiments, RSD 105 is a computer readable storage device encoded with program code and corresponding data, and RSD 105 can interchangeably be referred to as a non-transitory computer program product. RSD 105 may have a version of video player module 128 stored thereon, in addition to other program code. Processor 102 can access RSD 105 to provision electronic device 100 with program code that, when executed by processor 102, the program code causes or configures electronic device 100 to provide various aspects of the functionality described herein.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touch screen device, display 130 includes a tactile, touch screen interface 131 that allows a user to provide input to or to control electronic device 100 by touching features presented within/below the display screen. Tactile, touch screen interface 131 can be utilized as an input device. In one or more embodiments, display 130 can be modified by operation of the processor rendering a specific sequence of coded information to present a different graphical or text window or graphical user interface within the screen of display. In particular, display 130 is utilized as an output device and presents the media/video content that is being viewed by the user, including presenting the determined recap portions of media content before a current episode or remaining portion of a partially-viewed episode is presented.

Throughout the disclosure, the term image capturing device is utilized interchangeably to be synonymous with and/or refer to cameras 132. As illustrated, electronic device 100 includes camera 132 that is communicatively coupled to ICD controller 134, which is communicatively coupled to processor 102. ICD controller 134 supports the processing of signals from camera 132.

Electronic device 100 can further include charging circuitry 135, battery 136, and data port 138, for providing electrical power to the various electronic components of electronic device 100. Electronic device 100 further includes microphone 108, one or more output devices such as speaker 144, and one or more input buttons 107a-n. Input buttons 107a-n may provide controls for volume, power, and/or image capture devices 132. Microphone 108 can also be referred to as audio input device 108. Microphone 108 can be used to provide biometric data to identify or authenticate a user. Microphone 108 and input buttons 107a-n can also be referred to generally as input devices. Speaker 144 can provide an audio alert to a user of a received notification, in one embodiment.

Electronic device 100 further includes wireless communication subsystem (WCS) 142, which is coupled to antennas 148a-148n. In one or more embodiments, WCS 142 can include a communication module with one or more baseband processors or digital signal processors, one or more modems, and a radio frequency front end having one or more transmitters and one or more receivers. Wireless communication subsystem (WCS) 142 and antennas 148a-148n allow electronic device 100 to communicate wirelessly with wireless network 150 via transmissions of communication signals 194 to and from network communication devices 152a-152n, such as base stations or cellular nodes, of wireless network 150. Download of media content and recap portions of media content are received via communication signals 194 from wireless network 150.

In one or more embodiment, wireless network 150 can include one or more servers 190 that support wireless exchange of voice, data, and video and other communication with electronic device 100 and with a second electronic device 184. Wireless network 150 further allows electronic device 100 to communicate with video computer system (VCS) 180. Video computer system 180 is communicatively coupled to wireless network 150 by a wide area network (WAN) 195, such as the Internet. In an embodiment, servers 190 of wireless network 150 support wireless exchange of video, voice, data, text, media content and other communications between electronic device 100 and video computer system 180.

Second electronic device 184 is also communicatively coupled to wireless network 150. Second electronic device 184 can be similarly connected to wireless network 150, via one of network communication devices 152a-152n. In an embodiment, servers 190 of wireless network 150 support wireless exchange of voice, text, data, and video and other communication between video computer system 180 and second electronic device 184. While video computer system 180 is shown in communication with two electronic devices 100, 184, video computer system 180 can be in communication with more or fewer than two electronic devices.

Electronic device 100 further includes short range communication device(s) 164. Short-range communication device(s) 164 can include a low powered transceiver that can wirelessly communicate with other devices. Short-range communication device(s) 164 can include one or more of a variety of devices supporting different corresponding wireless protocols, such as a near field communication (NFC) device, a Bluetooth device, an ultra-wide band (UWB) device, and/or a wireless fidelity (Wi-Fi) device. Electronic device 100 can also indirectly connect to wireless network 150 via communication signals 197 transmitted by short-range communication device(s) 164 to and from WiFi router 196, which is communicatively coupled to WAN 195, such as the Internet. WAN 195 is then communicatively coupled to wireless network 150 and specifically to one of servers 190 of wireless network 150. Download of media content and recap portions of media content are received via communication signals 197 from WiFi router 196.

Short-range communication device(s) 164 can wirelessly communicate with WiFi router 196 via communication signals 197. In one embodiment, electronic device 100 can receive Internet or Wi-Fi based calls via short-range communication device(s) 164. In one embodiment, electronic device 100 can communicate with WiFi router 196 wirelessly via short-range communication device(s) 164. In an embodiment, WCS 142, antennas 148a-148n and short-range communication device(s) 164 collectively provide a communications subsystem of electronic device 100. In one embodiment, video computer system 180 can stream/transmit multimedia/video content (i.e., movies and videos) to electronic device 100 via WAN 195 through wireless network 150. In another embodiment, video computer system 180 can stream/transmit multimedia/video content (i.e., movies and videos) to electronic device 100 via WAN 195 through a local WiFi router 196 to which short-range communication device(s) 164 is/are communicatively connected.

Electronic device 100 further includes vibration device 146, fingerprint sensor 147, location sensor 160, and motion sensor(s) 161. Vibration device 146 can cause electronic device 100 to vibrate or shake when activated. Vibration device 146 can be activated to provide an alert or notification to a user of electronic device 100. According to one aspect of the disclosure, display 130, speakers 144, and vibration device 146 can generally and collectively be referred to as output devices. These output devices can be each utilized to present the different alerts to the user.

Fingerprint sensor 147 can be used to provide biometric data or images to identify or authenticate a user. Location sensor 160 can provide time data and location data about the physical location of electronic device 100. In one embodiment, location sensor 160 can be a global positioning system (GPS) device that uses data received from geospatial input received from GPS satellites.

Motion sensor(s) 161 can include one or more accelerometers 162 and gyroscope 163. Motion sensor(s) 161 can detect movement of electronic device 100 and provide motion data to processor 102 indicating the spatial orientation and movement of electronic device 100. Accelerometers 162 measure linear acceleration of movement of electronic device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of electronic device 100. Electronic device 100 further includes a housing 170 that contains the components of electronic device 100.

In one embodiment, video player module 128 includes program code that is executable by processor 102, and configures electronic device 100 to locally track video content consumption and time that a user is viewing video content on electronic device 100. In one embodiment, electronic device 100 can locally determine how much of a video recap is needed or transmit the local video content consumption and time to video computer system 180 to trigger the video computer system to perform an analysis of video consumption time and content and stream the appropriate amount of a video recap. In one embodiment, electronic device 100 can locally store user consumption data of video content that has been watched or viewed.

In the description of each of the following figures, reference is also made to specific components illustrated within the preceding figure(s). For continuity, similar or same components are presented with the same leading reference number.

Figure 2:
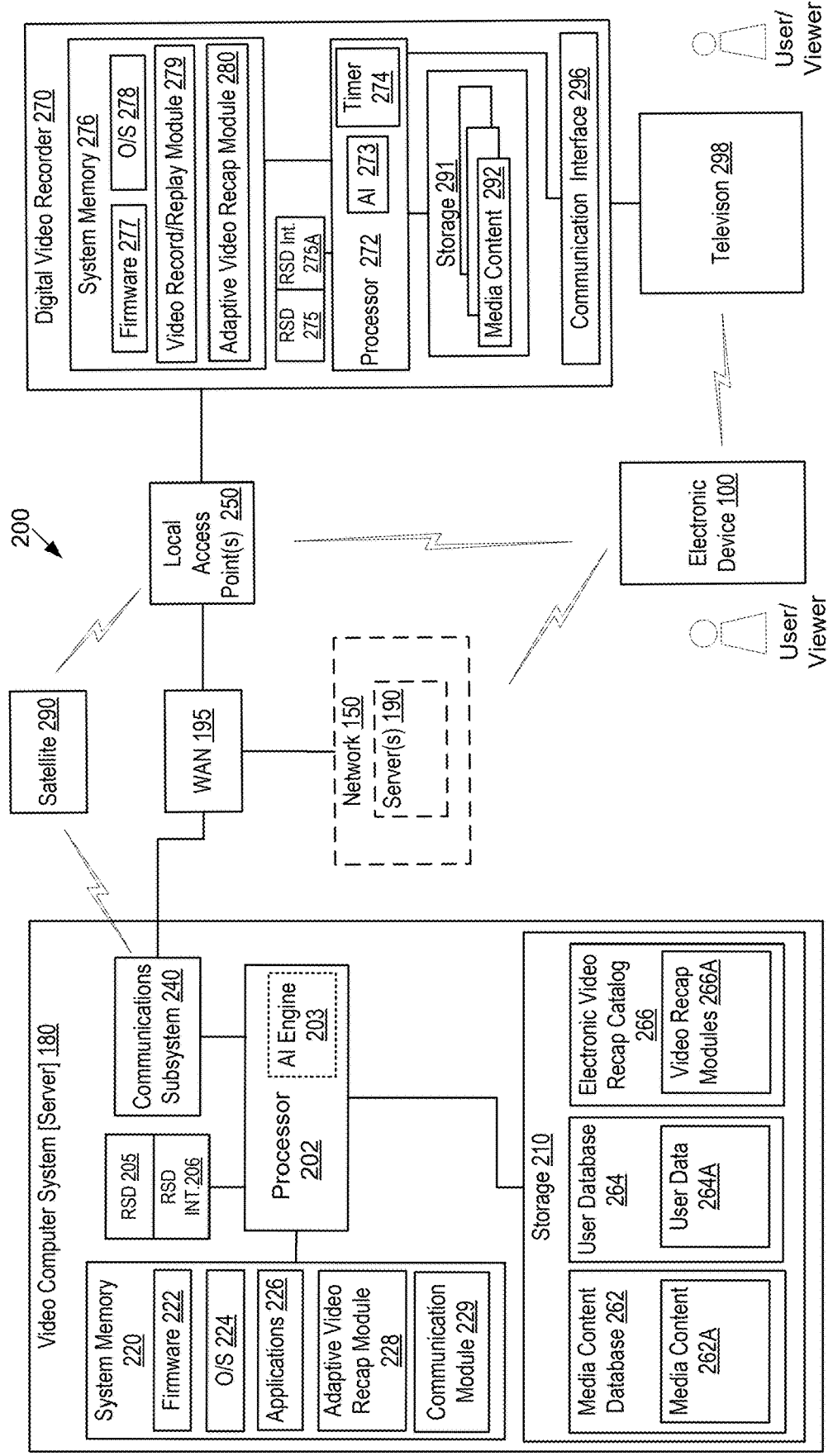
FIG. 2 depicts an example video computer system within an on-demand video presentation environment and within which various aspects of the disclosure can be implemented, according to multiple embodiments.

Turning to FIG. 2, there is illustrated various components within an on-demand video streaming environment 200, in accordance with multiple embodiments. On-demand video streaming environment 200 includes video computer system 180 and electronic device 100. On-demand video streaming environment 200 also includes an example digital video recorder (DVR 270. Video computer system 180 is shown communicatively connected with a wide area network (WAN) 195, which in turn is communicatively connected via wireless network 150 with electronic device 100. As previously described, WAN 195, which can be or can include the Internet, is communicatively coupled to server(s) 190 of wireless network 150 to support the connection to electronic device 100. In an embodiment, WAN 195 and servers 190 of wireless network 150 support the exchange of e-mail, text, data, videos, movies, and other types of communication between video computer system 180 and electronic device 100. In one embodiment, video computer system 180 provides video on demand and/or media streaming services. Video computer system 180 can also be communicatively connected to electronic device 100 via a satellite 290 orbiting the earth's atmosphere. Similar with WAN communication, video computer system 180 can provide satellite transmission of multimedia content, such as services provided by satellite TV providers, which utilize the available radio waves for satellite transmission to communicate similar content as with the WAN communication.

Video computer system 180 includes processor 202, which is communicatively coupled to storage 210, system memory 220, and communications subsystem 240. Processor 202 can include processor resources such as a primary processing unit (CPU) that support computing, classifying, processing and transmitting of data and information. Processor 202 can further include graphic processing units (GPU) and digital signal processors (DSP) that also support computing, classifying, processing and transmitting and receiving of data and information. Processor 202 can further include a hardware based artificial intelligence (AI) engine 203. AI engine 203 accelerates artificial intelligence, natural language processing (NLP), context evaluation (CE), and machine learning applications. AI engine 203 can also be implemented as a software module, in one embodiment.

In one or more embodiments, video computer system 180 includes removable storage device (RSD) 205, which is inserted into or communicatively attached to (e.g., via a cable) an RSD interface 206 that is communicatively coupled via system interlink to processor 202. In one or more embodiments, RSD 205 is a non-transitory computer program product or computer readable storage device. In one or more embodiments, RSD 205 is a computer readable storage device encoded with program code and corresponding data, and RSD 205 can interchangeably be referred to as a non-transitory computer program product. RSD 205 may have a version of adaptive video recap module 228 stored thereon, in addition to other program code. Processor 202 can access RSD 205 to provision video computer system 180 with program code that, when executed by processor 202, the program code causes or configures video computer system 180 to provide the functionality described herein.

Video computer system 180 includes storage 210, such as one or more hard drives or solid state drives. Storage 210 can store a media content database 262, user database 264, and electronic video recap catalog 266. Storage 210 can be or can include an external storage repository (not shown). Media content database 262 includes media content 262A. User database 264 includes user data 264A. Electronic video recap catalog 266 includes video recap modules 266A.

Media content 262A can include a variety of media such as audio, film, video, movies and television shows that can be streamed/transmitted to an electronic device. User data 264A can include information about a user of electronic device 100 who is consuming/viewing media content. User data 264A can include the identity (ID) of a user, the electronic device ID, user settings, titles/ID of media that have been previously viewed, episodes that have been viewed, respective viewing times of each episodes, and titles/ID of media content that is currently being viewed. In one embodiment, at least part of user data 264A can be generated by video computer system 180 monitoring the media content that is being consumed/viewed by a user of electronic device 100. In one additional/alternate embodiment, at least part of user data 264A can be generated by user's electronic device (100) or a local video replay system (e.g., DVR 270) that locally monitors the media content that is being consumed/viewed by a user of electronic device 100 or local replay system and transmits the user data to video computer system 180. Transmission of the user data can occur at the end of a viewing session and/or prior to a next viewing session (e.g., when additional content is to be viewed at a later/subsequent time). Video recap modules 266A include video recaps of different durations for media content, with the durations and included content of the video recaps being in part based on the elapsed time between (i) viewing of two episodes of the media content or (ii) resumption of viewing of a remaining portion of a single media content. Each video recap has a time duration and includes relevant content from at least one of the one or more prior episode(s).

System memory 220 may be a combination of volatile and non-volatile memory, such as random access memory (RAM) and read-only memory (ROM). System memory 220 can store program code and data associated with firmware 222, an operating system 224, applications 226, adaptive video recap module 228, and communication module 229. Adaptive video recap module 228 includes program code that is executable by processor 202 to configure video computer system 180 to determine and selectively present an optimal duration of video recap of media content. Communication module 229 includes program code that is executed by processor 202 to enable video computer system 180 to communicate with other external devices and systems.

Processor 202 loads and executes program code stored in system memory 220, including program code associated with applications 226 and program code associated with adaptive video recap module 228, and communication module 229. When processed/executed by processor 202, the program code causes or configures video computer system 180 to provide the various functionality described herein.

Communications subsystem 240 allows video computer system 180 to communicate with WAN 195, network 150 and satellite 290. In one embodiment, communications subsystem 240 can include one or more network interface controllers and other components.

On-demand video streaming environment 200 further includes one or more local access points 250, DVR 270, and television 298. In one embodiment, local access points 250 can be WiFi connected routers that are communicatively coupled to WAN 195 and DVR 270. Local access points 250 can also be wirelessly communicatively coupled with electronic device 100 and satellite 290. DVR 270 can communicate with video computer system 180 via local access points 250 and WAN 195.

DVR 270 includes processor 272, which is communicatively coupled to storage 291, system memory 276, and communications interface 296. Processor 272 can include processor resources such as a primary processing unit (CPU) that support computing, classifying, processing and transmitting of data and information. Processor 272 can further include graphic processing units (GPU) and digital signal processors (DSP) that also support computing, classifying, processing and transmitting and receiving of data and information. Processor 272 can further include a hardware based artificial intelligence (AI) engine 273 and timer 274. AI engine 273 accelerates artificial intelligence, natural language processing (NLP), context evaluation (CE), and machine learning applications. AI engine 273 can also be implemented as a software module, in one embodiment. Timer 274 can monitor a viewing time of media content by a user.

In one or more embodiments, DVR 270 includes removable storage device (RSD) 275, which is inserted into or communicatively attached to (e.g., via a cable) an RSD interface 275A that is communicatively coupled via system interlink to processor 272. In one or more embodiments, RSD 275 is a non-transitory computer program product or computer readable storage device. In one or more embodiments, RSD 275 is a computer readable storage device encoded with program code and corresponding data, and RSD 275 can interchangeably be referred to as a non-transitory computer program product. RSD 275 may have a version of adaptive video recap module 280 stored thereon, in addition to other program code. Processor 272 can access RSD 275 to provision DVR 270 with program code that, when executed by processor 272, the program code causes or configures DVR 270 to provide the functionality described herein.

DVR 270 includes storage 291, such as one or more hard drives or solid state drives. Storage 291 can store media content 292. Media content 292 can include a variety of media such as audio, film, video, movies and television shows that can be transmitted to television 298. In one embodiment, DVR 270 can locally store media content 292 received from video computer system 180 and transmit the locally stored media content 292 to television 298 for viewing by a user or viewer. In another embodiment, media content can be wirelessly streamed from electronic device 100 to television 298 for viewing by a user.

System memory 276 may be a combination of volatile and non-volatile memory, such as random access memory (RAM) and read-only memory (ROM). System memory 276 can store program code and data associated with firmware 277, an operating system 278, video record/replay module 279, and adaptive video recap module 280. Video record/replay module 279 includes program code that is executable by processor 272 to configure DVR 270 to record received media content and to replay media content via television 298. Adaptive video recap module 280 includes program code that is executable by processor 272 to configure DVR 270 to determine and selectively present an optimal duration of video recap of media content.

Processor 272 loads and executes program code stored in system memory 276, including program code associated with video record/replay module 279 and program code associated with adaptive video recap module 280. When processed/executed by processor 202, the program code causes or configures DVR 270 to provide the various functionality described herein. Communications interface 296 allows DVR 270 to communicate with television 298.

Figure 3A:
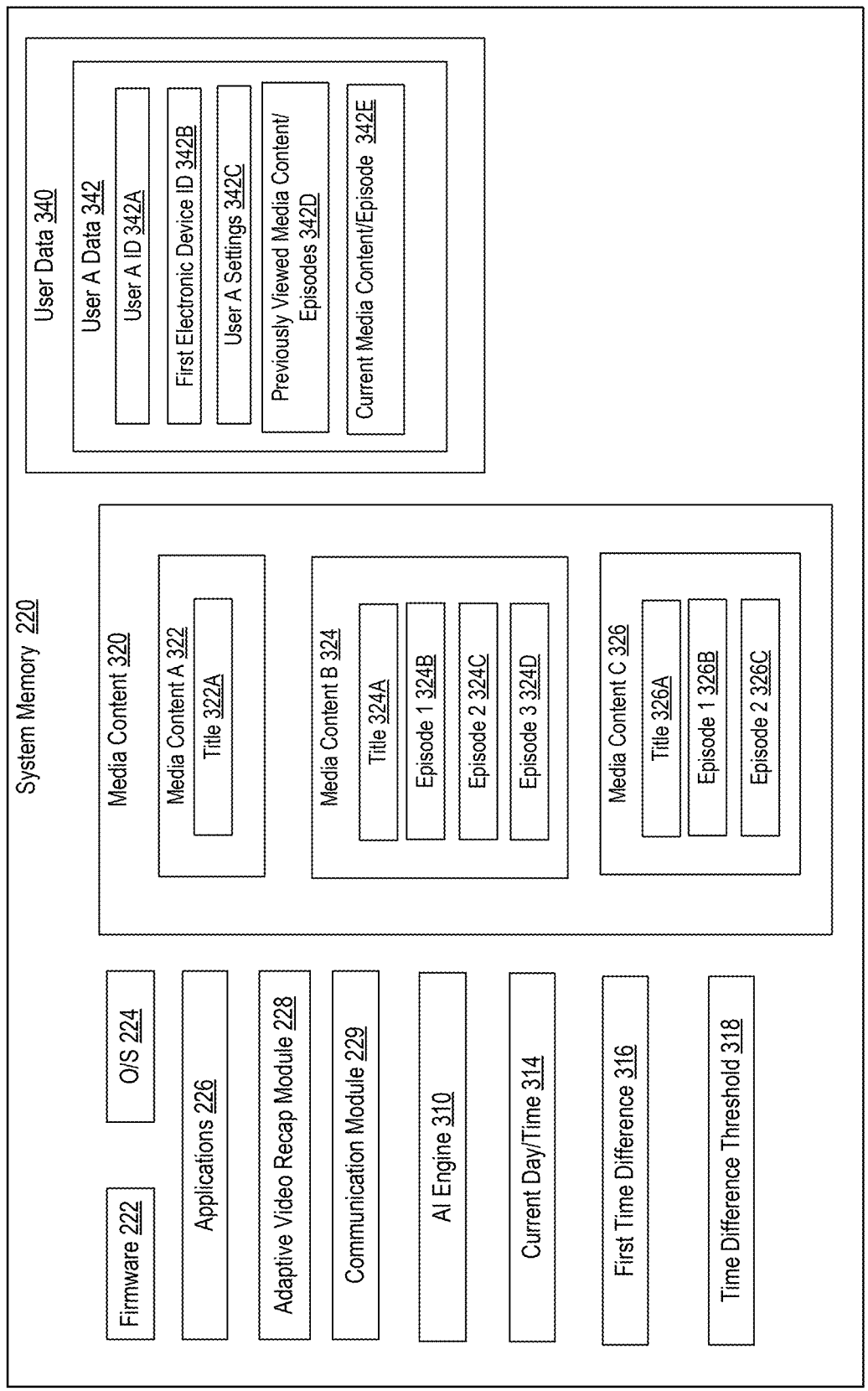
FIGS. 3A and 3B present block diagram representations of example contents of the system memory of the example video computer system of FIG. 2, which is configured to complete the various processes described herein, according to one or more embodiments.

Referring to FIG. 3A, there is shown one embodiment of example contents of system memory 220 of video computer system 180 configured to complete the various processes described herein. It is appreciated that memory 276 of DVR 270 may have some of the similar contents to enable the processes provided by DVR 270. System memory 220 includes data, software, and/or firmware modules, including firmware 222, an operating system (O/S) 224, applications 226, adaptive video recap module 228, communication module 229, and artificial intelligence (AI) engine 310.

Adaptive video recap module 228 includes program code that is executed by processor 102 to configure electronic device 100 to perform the various features of the present disclosure. In one or more embodiments, adaptive video recap module 228 configures video computer system 180 to determine a time duration for a video recap of at least one of the one or more prior episodes of media content and to stream the time duration of the video recap of the first media content to an electronic device as a preview presented prior to streaming the current episode of the media content for presentation on the electronic device. In one embodiment, the time duration for the video recap can be based, in part, on a time difference between a current time and a previous viewing time of the one or more prior episodes of the media content. AI engine 310 includes program code that can accelerate artificial intelligence, natural language processing (NLP), context evaluation (CE), and machine learning applications.

In one or more embodiments, execution of adaptive video recap module 228 by processor 202 configures video computer system 180 to perform the processes presented in the flowcharts of FIGS. 6-9, as will be described below. Communication module 229 configures video computer system 180 to communicate and exchange data with other devices via WAN 195 and wireless network 150.

System memory 220 also includes current day/time 314, first time difference 316, and time difference threshold 318. Current day/time 314 includes the current day/month/year and the current time of the day (e.g., HH: MM: SS). First time difference 316 is an elapsed time between a current time 314 and a previous viewing time of one or more prior episodes of media content. Time difference threshold 318 is a threshold time value, whereby when the time difference between a current time and the last viewing time of media content is less than the time difference threshold, streaming of a video recap to the electronic device is withheld and automatic streaming of the media content is initiated without the video recap.

System memory 220 includes media content 320, user data 340 and video recaps 360. Media content 320 is media content that can be streamed/transmitted to one or more electronic devices. In one embodiment, media content 320 can be retrieved from media content database 262, user data 340 can be retrieved from user database 264, and video recaps 360 can be retrieved from electronic video recap catalog 266. Media content 320 can include a variety of media such as audio, film, video, movies and television shows that can be streamed to an electronic device. Media content 320 includes media content A 322, media content B 324, and media content C 326.

Media content A 322 includes title 322A. In one embodiment, media content A 322 is a single video. Media content B 324 includes title 324A and several episodes including episode 1 324B, episode 2 324C, and episode 3 324D. Media content C 326 includes title 326A, episode 1 326B, and episode 2 326C. An episode is a narrative unit within a larger media content production, such as a series intended for streaming consumption. While media content B 324 was shown with three episodes and media content C 326 was shown with two episodes, each video contained in media content 320 can have more than three episodes or fewer than two episodes. In one embodiment, media content 320 can have fifty or a hundred episodes that are part of a film or movie series. A film or movie series is a collection of related episodes in succession that share the same related plot, characters and setting. In one embodiment, the media content of media content B 324 and media content C 326 includes a plurality of episodes that are part of a multi-episode series.

User data 340 includes user A data 342. User A data 342 includes user A identity (ID) 342A, first electronic device ID 342B associated with user A ID 342A, user A settings 342C, previously viewed media content/episodes 342D, and current media content/episode 342E. User A identity (ID) 342A can include the name of a user that is consuming media content. First electronic device ID 342B identifies the electronic device (e.g., electronic device 100) associated with user A ID 342A. User A settings 342C include user preferences and video recap options selected by a user for viewing video recaps. Previously viewed media content/episodes 342D include the titles/ID of previously viewed media content, and the respective episodes that have been viewed. Current media content/episode 342E incudes the title/ID/episode or single ID of any media content that is currently being viewed or consumed by user A. While user data 340 was shown with one user A data 342 for a single user, user data 340 can include user data for hundreds or thousands of users.

Figure 3B:
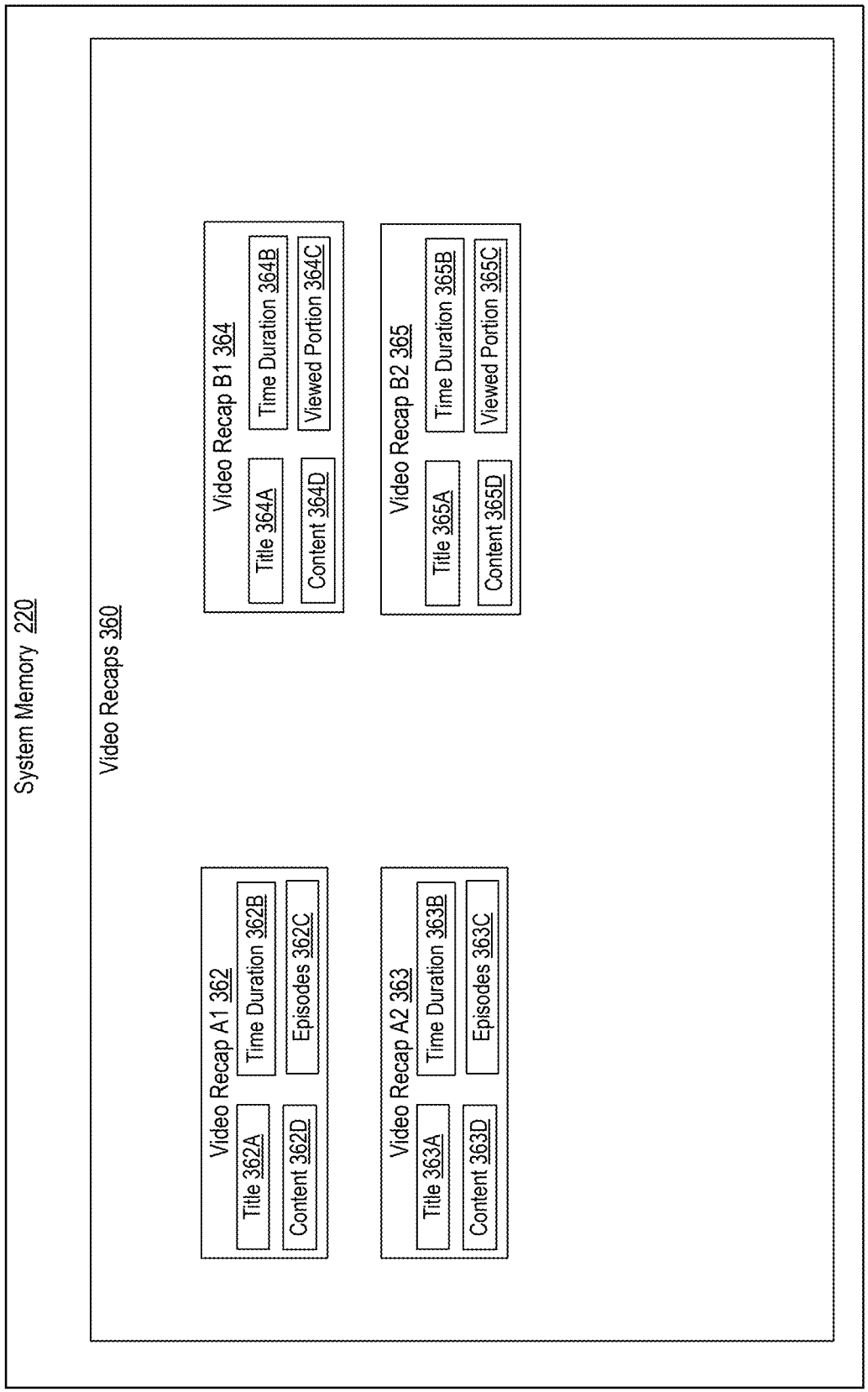

Turning to FIG. 3B, video recaps 360 include video recaps of different durations for each title of media content. In one embodiment, electronic device 100 generates video recaps 360 based on the episodes or video portion viewed and the time difference since the last viewing. Video recaps 360 include video recap A1 362, video recap A2 363, video recap B1 364, and video recap B2 365. Video recap A1 362 and video recap A2 363 are generated for recapping previously watched episode within a series, whereas video recap B1 364 and video recap B2 365 are generated for a partially watched media content. Video recap A1 362 includes title 362A, time duration 362B, episodes 362C and content 362D. Title 362A is the title of the media content that the video recap corresponds to. Time duration 362B is the time length of the video recap. Episodes 362C are the episodes that are included in or summarized by the video recap. Content 362D is the media content or video included in the video recap. Video recap A2 363 includes title 363A, time duration 363B, episodes 363C and content 363D. Title 363A is the title of the same media content that video recap A2 363 corresponds to. Time duration 363B is the time length of the video recap A2 363. Episodes 363C are the episodes that are included in or summarized by the video recap A2 363 and can be a different set of episodes from episodes 362C, in significant part based on the last episode that was watched and in part based on the time duration since the last episode was watched. Content 363D is the media content included in the video recap A2 363. It is appreciated that the length and included content of video recap A2 263 will differ from the length and included content of video recap A1 362 because of several factors that can include the episodes that have been watched, the time duration between the last episode watch and a current episode being queued for watching, and other factors, such as established user preferences.

Video recap B1 364 includes title 364A, time duration 364B, portion viewed 364C and content 362D. Video recap B1 364 corresponds to a recap of single media content (e.g., media content A 322). Title 364A is the title of the media content that the video recap corresponds to. Time duration 364B is the time length of the video recap. Viewed portion 364C is the portion of the partially viewed single media content that has been viewed that is summarized by the video recap. Content 364D is the media content included in the video recap and includes the summary of the partially viewed portion. In one embodiment, viewed portion 364C comprises a plurality of previously viewed portions of the first media content that were viewed at different times, and content 364D comprises relevant content from the plurality of previously viewed portions of the media content. Video recap B2 365 includes title 365A, time duration 365B, portion viewed 365C and content 365D. Video recap B2 365 corresponds to a recap of single media content (e.g., media content A 322). Title 365A is the title of the media content that the video recap corresponds to. Time duration 365B is the time length of the video recap. Viewed portion 365C is the portion of the partially viewed single media content that has been viewed that is summarized by the video recap. Content 365D is the media content included in the video recap and includes the summary of the partially viewed portion. While video recaps 360 were shown with four video recaps, video recaps 360 can have hundreds or thousands of video recaps.

Figure 4A:
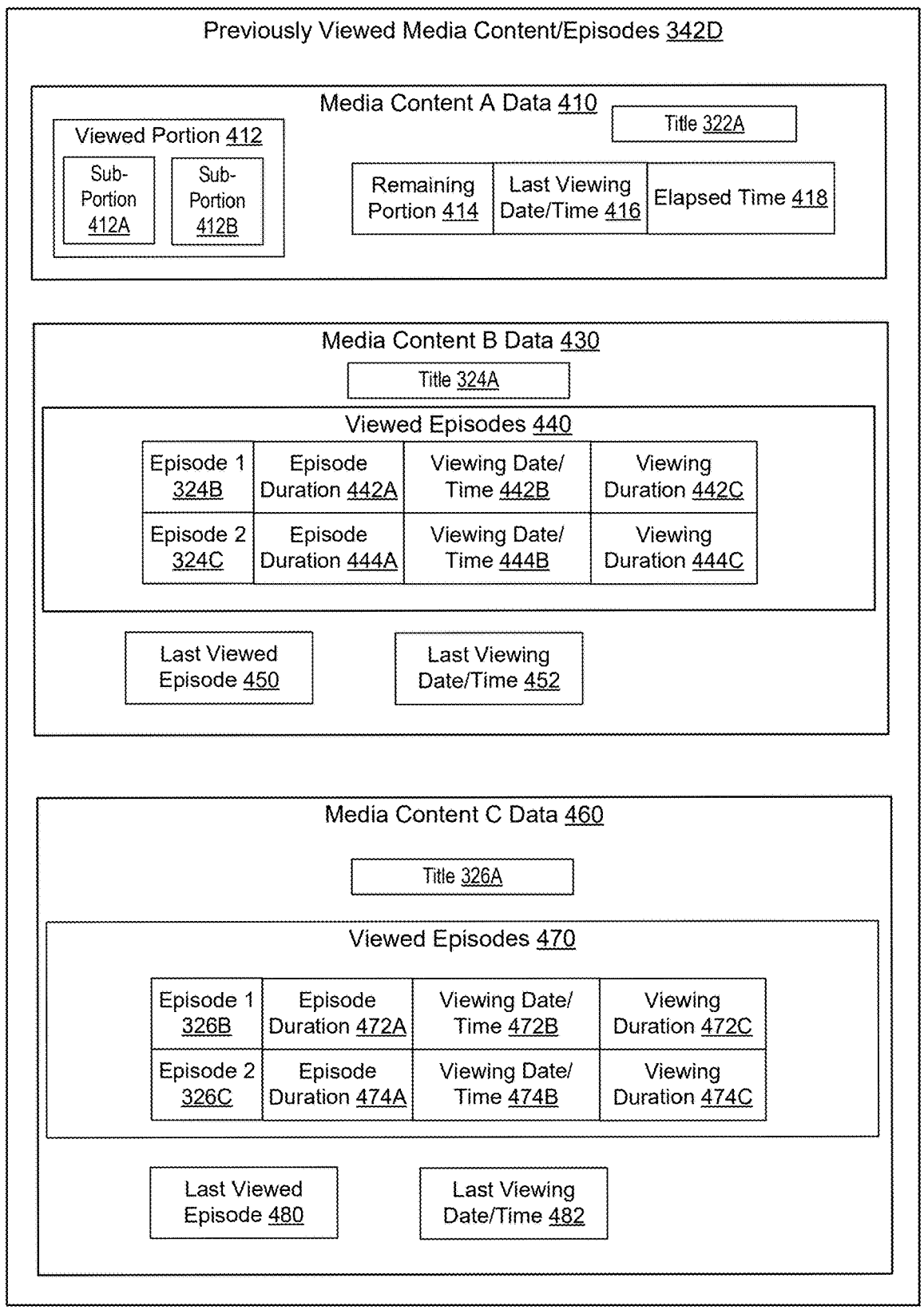
FIG. 4A is an example block diagram illustrating additional details of the previously viewed media content/episodes of FIG. 3A, according to one or more embodiments.

With reference to FIG. 4A, additional details of the contents of previously viewed media content/episodes 342D of FIG. 3A are shown. Previously viewed media content/episodes 342D include media content A data 410, media content B data 430, and media content C data 460. Media content A data 410 includes viewed portion 412, remaining portion 414, last viewing date/time 416 and elapsed time 418. Viewed portion 412 is the total portion of media content A 322 that has been viewed. In one example embodiment, viewed portion 412 can be 10 minutes. Viewed portion 412 includes sub-portions 412A and 412B that were viewed at different times. In one embodiment, a video recap can comprise relevant content from previously viewed sub-portions 412A and 412B of media content A 322. Remaining portion 414 is the portion of media content A 322 that is left to be viewed. In one example embodiment, remaining portion 414 can be 15 minutes. Last viewing date/time 416 is when media content A 322 was previously viewed. Elapsed time 418 is the time between the previous or last viewing time 416 and the present or current viewing time of the media content (e.g., media content A 322).

Media content B data 430 includes viewed episodes 440 that have been viewed, including episode 1 324B, and episode 2 324C. Viewed episodes 440 include the time length or duration 442A, and 444A of each respective episode, the viewing date/time 442B and 444B when each respective episode was viewed, and the viewing duration (i.e., how long a user watched each episode) 442C and 444C. Viewing durations 442C and 444C are used in determining the time duration of generated video recaps or are used in selecting a video recap from electronic video recap catalog 266. Media content B data 430 includes last viewed episode 450 and last viewing date/time 452. Last viewed episode 450 is the last viewed episode of media content B 324 by a specific user and last viewing date/time 452 is the last date/time that last episode 450 was viewed by the user. Last viewing date/time 452 is used in determining the time duration of generated video recaps or is used in selecting a video recap from electronic video recap catalog 266. Last viewed episode 450 is used in determining the content of previously viewed episodes that are included generated video recaps or are used in selecting a video recap from electronic video recap catalog 266.

Media content C data 460 includes viewed episodes 470 that have been viewed including episode 1 326B, and episode 2 326C. Viewed episodes 470 include the time length or duration 472A and 474A of each respective episode, the viewing date/time 472B and 474B when each respective episode was viewed, and the viewing duration (i.e., how long a user watched each episode) 472C and 474C. Media content C data 460 includes last viewed episode 480 and last viewing date/time 482. Last viewed episode 480 is the last viewed episode of media content C 326 by a specific user and last viewing date/time 482 is the last date/time that the last episode 480 was viewed by the user.

With reference to FIG. 4B, additional details of the contents of video recap modules 266A of FIG. 2 are shown. Video recap modules 266A include several video recaps having different durations, different lengths of first portions viewed, and a different set/amount of relevant content presented within each of the different lengths of the first portions. In one embodiment, electronic device 100 retrieves and selects a video recap from video recap modules 266A based on the episodes or portion viewed and the time difference since the last viewing.

Video recap modules 266A include video recaps of different durations of video recaps for several titles of media content. Video recaps modules 266A include video recap A 490, video recap B 492, video recap C 494, and video recap D 496. Video recap A 490 includes title 490A, time duration 490B, episodes 490C and content 490D. Title 490A is the title of the media content that the video recap corresponds to. Time duration 490B is the time length of the video recap. Episodes 490C are the episodes that are included in or summarized by the video recap. Content 490D is the media content included in the video recap. Video recap B 492 includes title 492A, time duration 492B, episodes 492C and content 492D.

Video recap C 494 includes title 494A, time duration 494B, portion viewed 494C and content 494D. Video recap C 494 corresponds to a recap of a single media content (e.g., media content A 322). Title 494A is the title of the media content that the video recap corresponds to. Time duration 494B is the time length of the video recap. Viewed portion 494C is the portion of the partially viewed single media content that has been viewed and is summarized by the video recap. Content 494D is the media content included in the video recap. In one embodiment, viewed portion 494C comprises a plurality of previously viewed portions of the first media content that were viewed at different times, and content 494D comprises relevant content from the plurality of previously viewed portions of the media content. Video recap D 496 includes title 496A, time duration 496B, portion viewed 496C and content 496D. While video recap modules 266A were shown with four video recaps, video recap modules 266A can have hundreds or thousands of video recaps.

According to one aspect of the disclosure, video computing system 180 can detect selection of a current episode 342E of media content 320 for playback. The media content is presented sequentially within a plurality of episodes that includes one or more prior episodes (e.g., viewed episodes 440) that precede the current episode being initiated for playback. In response to detecting selection of the current episode 342E of the media content for playback, video computing system 180 determines a first time difference 316 between a current time 314 and a last previous viewing time 452 of the one or more prior episodes (e.g., viewed episodes 440). Video computing system 180 determines, based on the first time difference 316, at least a first time duration 362B for a video recap A1 362 of at least one of the one or more prior episodes of the first media content. Video computing system 180 streams the first time duration 362B of the first video recap A1 362 of the first media content for presentation on electronic device 100 as a preview presented prior to streaming the current episode 342E of the first media content for presentation on the electronic device 100.

According to another aspect of the disclosure, video computing system 180 generates the first video recap A1 362 of the first media content (e.g., media content B 324) from the one or more prior viewed episodes 362C (i.e., viewed episodes 440 corresponding to episodes 1 324B and 2 324C). The first time duration 362B of the first video recap A1 362 is determined at least in part based on the first time difference 316. In a first example embodiment, the first time difference 316 can be one day and the prior viewed episodes 362C can be two episodes. The resulting generated first video recap A1 362 could have a relatively short time duration to summarize just the most recently viewed or the two episodes that were viewed the previous day. In a second example embodiment, the first time difference 316 can be three weeks and the prior viewed episodes 362C can be ten episodes. The resulting generated first video recap A1 362 could have a longer duration to summarize the ten episodes that were viewed over the past three weeks.

According to an additional aspect of the disclosure, video computing system 180 retrieves from an electronic video recap catalog 266 of different durations of video recap modules 266A, a video recap A 490 having the first time duration 490B and that includes relevant media content 490D from at least one of the one or more previously viewed episodes 490C (i.e., viewed episodes 440 corresponding to episodes 1 324B and 2 324C) based on selection criteria comprising the first time duration 362B and the current episode 342E being selected for playback. It is appreciated that a different video recap would be generated for each new episode as the important details/content from the most recently viewed previous episode would likely be most relevant to include within the recap.

According to one more aspect of the disclosure, video computing system 180 can detect selection of first media content (e.g., media content A 322) for initiation of playback at a present viewing time (e.g., current time 314) and identify that the playback is a continuation of a previous playback of a first portion 412 of the first media content from a previous viewing time 416. Video computing system 180 determines an elapsed time 418 between the previous or last viewing time 416 and the present viewing time (e.g., current time 314) of the first media content. Video computing system 180 determines a first video recap time duration 364B for providing an optimal time length of a first video recap of the first portion 412 of the first media content. The first video recap time duration 364B is based on a value of the elapsed time 418. video computing system 180 presents the first video recap (e.g., video recap B 364) having the determined first video recap time duration 364B prior to initiating playback of a remaining portion 414 of the first media content According to yet another aspect of the disclosure, video computing system 180 generates the first video recap B 364 of the first portion 412 of the first media content (e.g., media content A 322). The video recap B 364 comprises relevant content 364D from the first portion 412 of the first media content.

According to an additional aspect of the disclosure, video computing system 180 retrieves from an electronic video recap catalog 266 of different durations of video recap modules 266A, video recap C 494 having the first video recap time duration 364B and comprising relevant media content 494D from the first portion 412 (i.e., viewed portion 494C) of the first media content (e.g., media content A 322). The video recap modules 266A are pre-generated based on different time durations between a previous viewing time 416 and a current viewing time 314, different lengths of first viewed portions, and an amount of relevant content presented within each of the different lengths of the first viewed portion 412.

According to another aspect of the disclosure, the viewed portion 364C of media content (e.g., media content A 322)

comprises a plurality of previously viewed portions of the media content that were viewed at different times and the video recap B1 364 comprises relevant content from the plurality of previously viewed portions 364C of the media content.

According to one more aspect of the disclosure, DVR 270 can detect selection of a current episode of media content 292 for playback. The media content is presented sequentially within a plurality of episodes that includes one or more prior episodes that precede the current episode being initiated for playback. In response to detecting selection of the current episode of the media content 292 for playback, DVR 270 determines a first time difference between a current time and a last previous viewing time of the one or more prior episodes. DVR 270 determines, based on the first time difference, at least a first time duration for a video recap of at least one of the one or more prior episodes of the first media content. DVR 270 streams the first time duration of the first video recap of the first media content for presentation on television 298 as a preview presented prior to streaming the current episode of the first media content for presentation on television 298.

Figure 5:
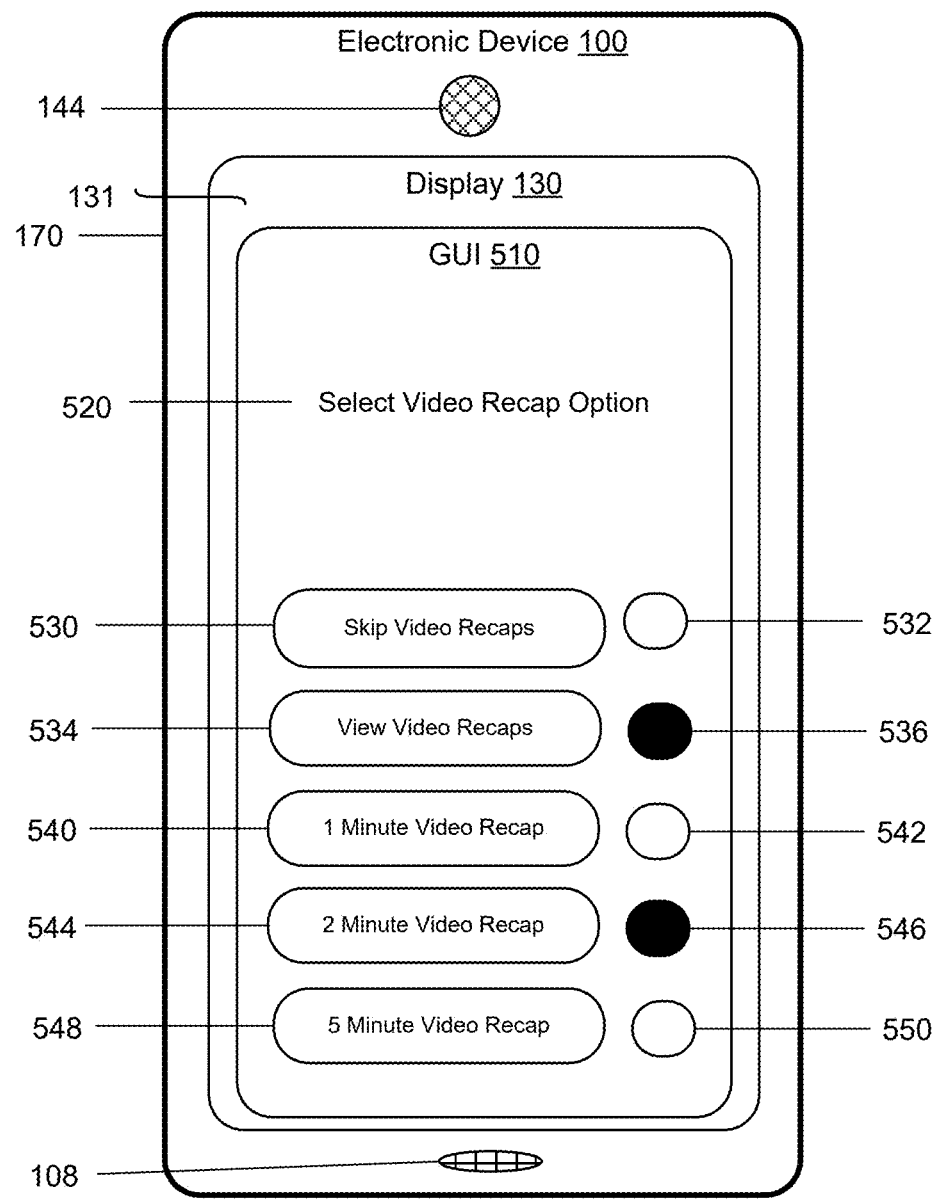
FIG. 5 is an example illustration of a display of an electronic device presenting a graphical user interface (GUI) that includes several selectable video recap options that can be selected by a user, according to one or more embodiments.

With reference to FIG. 5, electronic device 100 is shown with an example select video recap (SVR) option graphical user interface (GUI) 510 rendered and presented on display 130. SVR option GUI 510 enables a user of electronic device 100 to select if a video recap is presented prior to viewing media content or if the video recap is skipped prior to viewing media content. SVR option GUI 510 further enables a user of electronic device 100 to select a desired time length of a video recap that is presented prior to viewing media content. In one embodiment, video computer system 180 can trigger the surfacing of SVR option GUI 510 on display 130 by sending a message to electronic device 100.

SVR option GUI 510 includes a message 520 to select a video recap option. SVR option GUI 510 further includes selectable skip video recaps option 530, with option on/off indication 532, and selectable view video recaps option 534, with option on/off indication 536. When selected, skip video recaps option 530 can be transmitted to video computer system 180 and trigger video computer system 180 to withhold the streaming of video recaps 360 to electronic device 100. When selected, view video recaps option 534 can be transmitted to video computer system 180 and trigger video computer system 180 to stream at least one of video recaps 360 to electronic device 100. In FIG. 5, view video recaps option 534 is shown as being selected with option on/off indication 536 filled in.

SVR option GUI 510 further includes selectable one minute video recap option 540 with option on/off indication 542, two minute video recap option 544 with option on/off indication 546, and five minute video recap option 548 with option on/off indication 550. When selected, the respective selected video recap option triggers video computer system 180 to generate the selected time length of video recap for streaming to electronic device 100 prior to presentation of the media content. In FIG. 5, two minute video recap option 544 is shown as being selected with option on/off indication 546 filled in.

According to one aspect of the disclosure, video computing system 180 can receive, from electronic device 100, a skip video recap option 530 selection. In response to receiving the skip video recap option 530 selection, video computing system 180 withholds streaming of video recaps 360 to electronic device 100.

According to another aspect of the disclosure, video computing system 180 can receive, from electronic device 100, a video recap option (e.g., two minute video recap option 544) selection from a user of the electronic device. The video recap option selection includes a user selected time duration (i.e., two minutes) for the first video recap (e.g., video recap A 362). In response to receiving the video recap option selection, video computing system 180 generates the first video recap 362 of the first media content from the one or more prior episodes. The time duration of the first video recap 362 is determined at least in part based on the user selected time duration.

Figure 6:
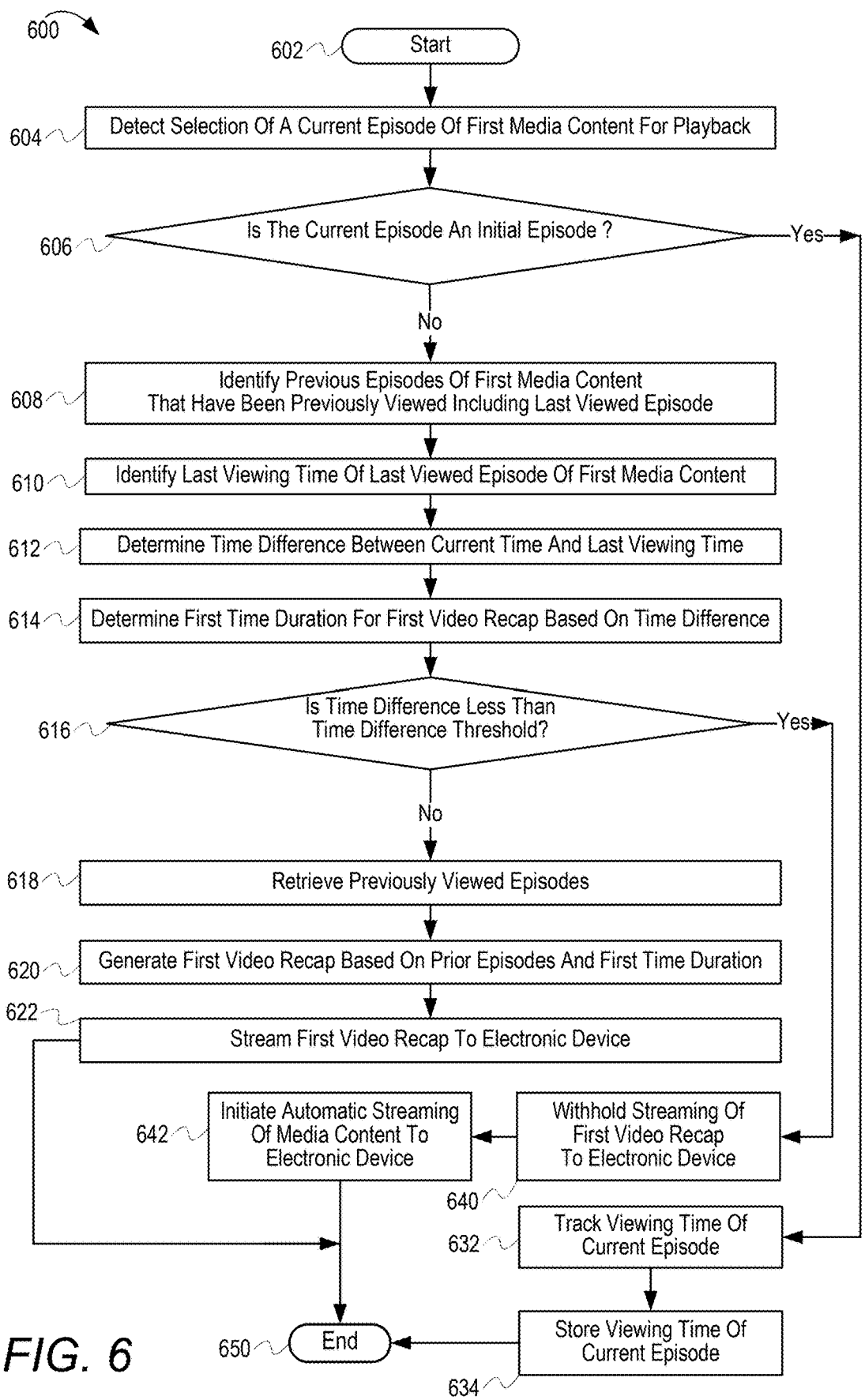
FIG. 6 depicts a flowchart of a method by which a video computer system generates and streams a determined optimal time duration of a video recap of one or more episodes of media content to at least one electronic device, according to one or more embodiments.
Figure 7:
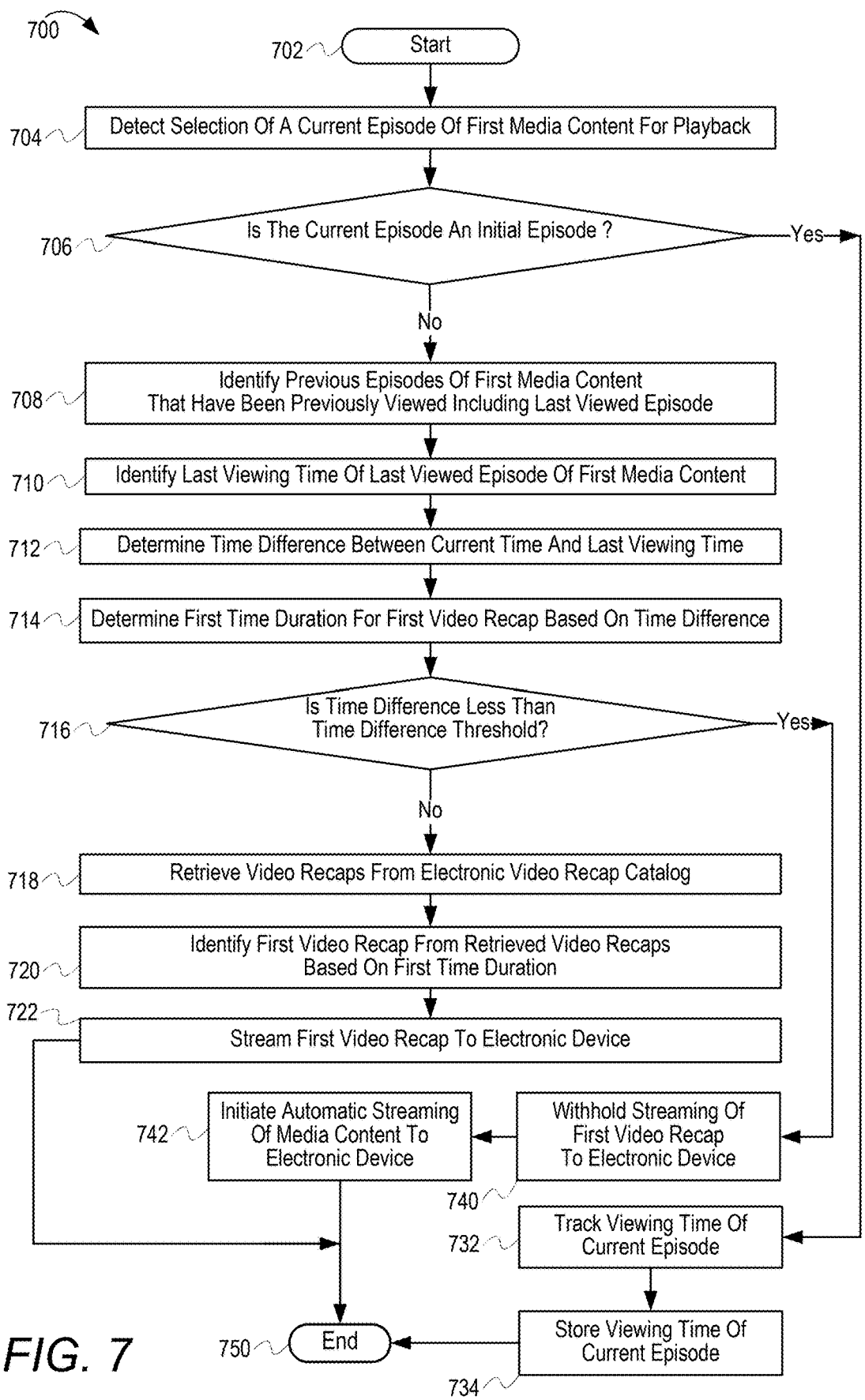
FIG. 7 depicts a flowchart of a method by which a video computer system selectively streams, to at least one electronic device, a video recap that has been retrieved from an electronic catalog of video recaps, according to one or more embodiments.
Figure 8:
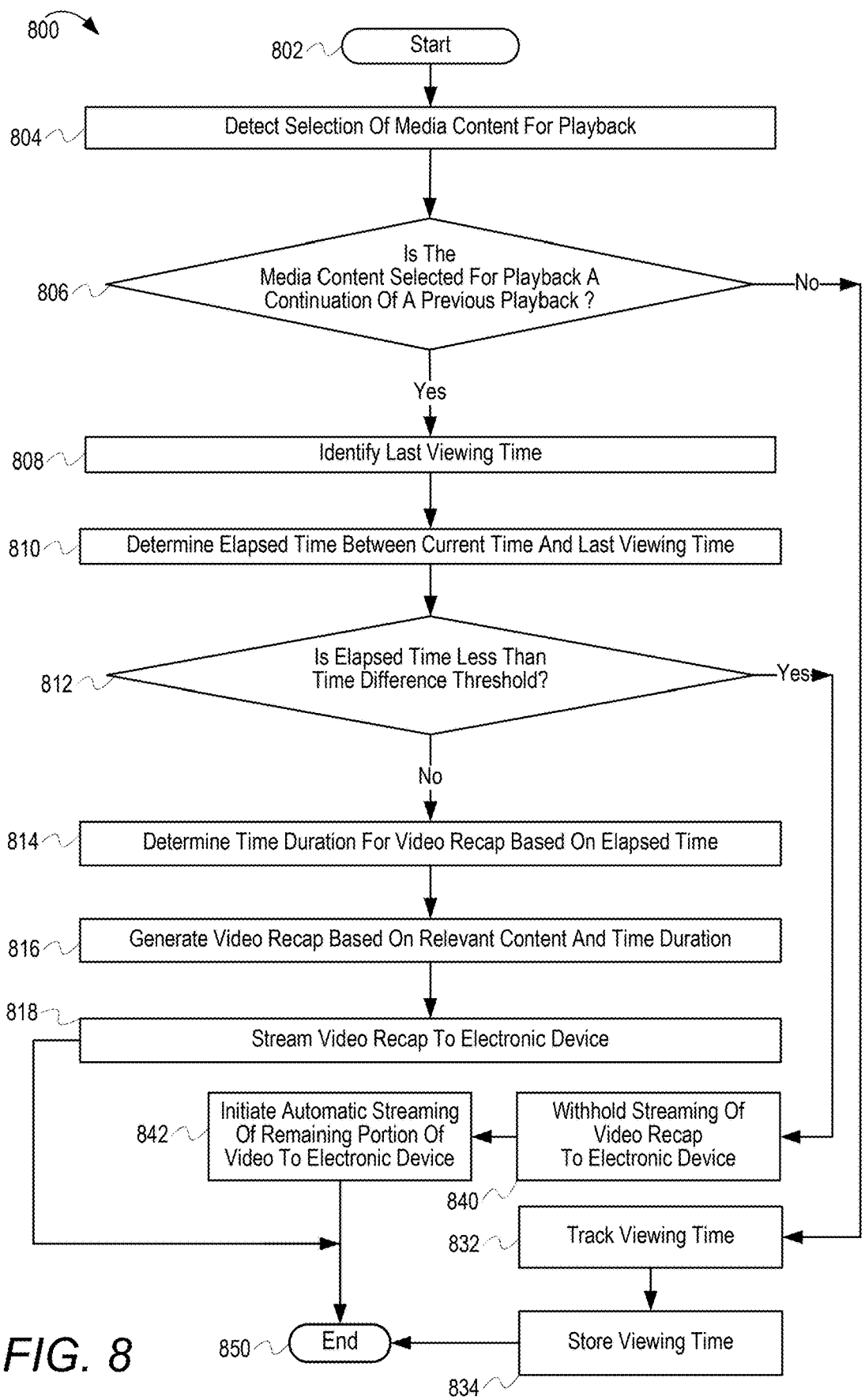
FIG. 8 depicts a flowchart of a method by which a video computer system generates and streams, to at least one electronic device, a determined optimal time duration of a video recap of a partially viewed video, according to one or more embodiments.
Figure 9:
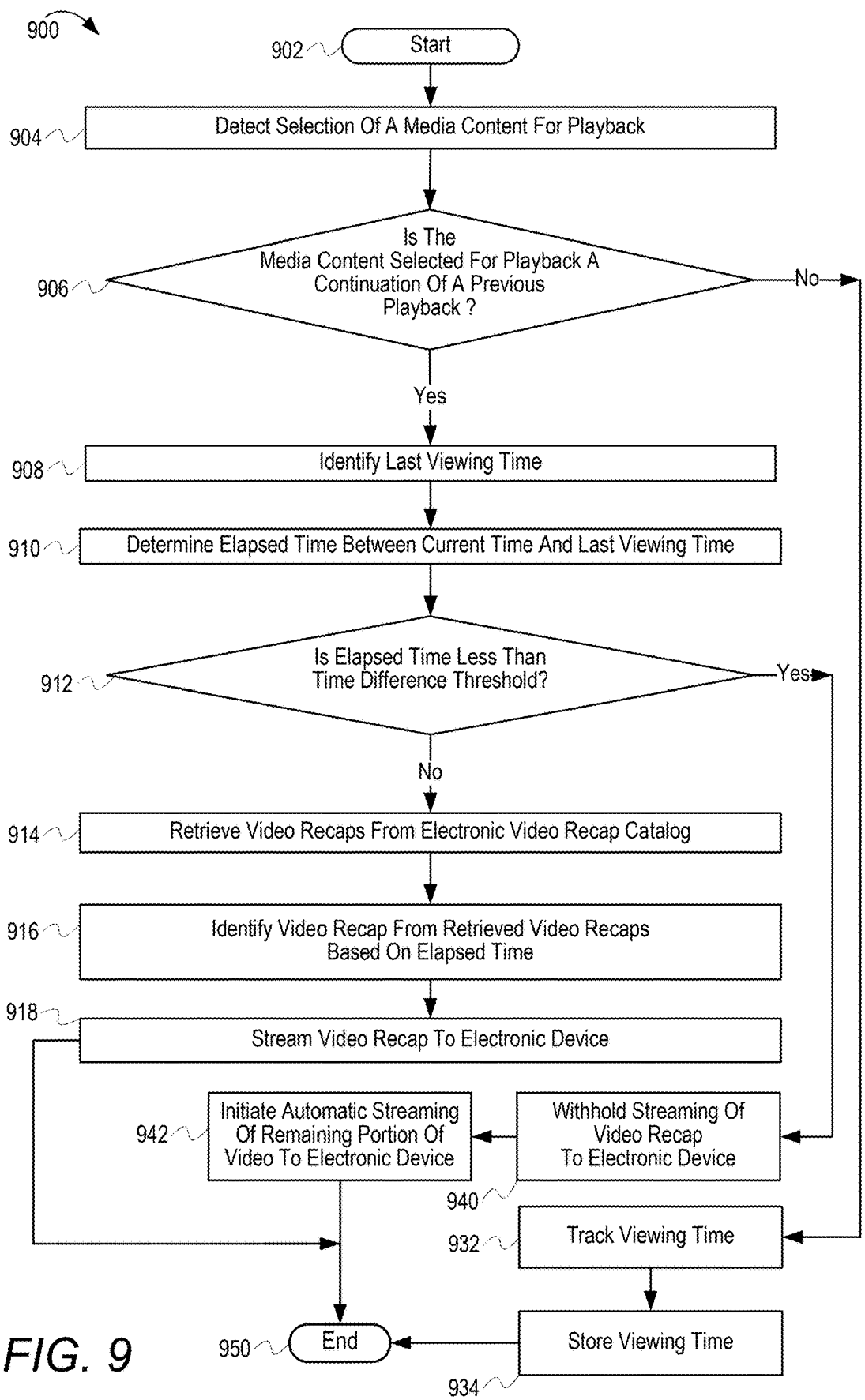
FIG. 9 depicts a flowchart of a method by which a video computer system selectively streams a video recap of a partially viewed video that has been retrieved from an electronic catalog of video recaps to at least one electronic device, according to one or more embodiments.

FIG. 6 depicts method 600 by which video computer system 180 determines, generates and streams an optimal time duration of a video recap of media content to at least one electronic device. FIG. 7 depicts method 700 by which video computer system 180 selectively streams, to at least one electronic device, a video recap that has been retrieved from an electronic catalog of video recaps. FIG. 8 depicts method 800 by which video computer system 180 determines, generates, and streams an optimal duration of video recap of partially-viewed media content to at least one electronic device. FIG. 9 depicts method 900 by which video computer system 180 selectively streams, to at least one electronic device, a video recap of partially-viewed media content, where the video recap is retrieved from an electronic catalog of video recaps.

The description of methods 600, 700, 800 and 900 will be described with reference to the devices and components and examples of FIGS. 1-5. The operations depicted in FIGS. 6-9 can be performed by video computer system 180 or any suitable computing system, such as DVR 270, that includes the one or more functional components of video computing system 180 that provide/enable the described features. One or more of the processes of the methods described in FIGS. 6-9 may be performed by processor 202 executing program code associated with adaptive video recap module 228 and configuring the video computing system to perform the various processes.

With specific reference to FIG. 6 method 600 begins at the start block 602. At block 604, method 600 includes detecting selection of a current episode 342E (e.g., episode 3 324D) of media content 320 for playback. The media content is presented sequentially within a plurality of episodes comprising one or more prior viewed episodes 440 that precede the current episode 342E that is being initiated for playback. In response to detecting selection of the current episode 342E of the media content for playback, method 600 includes determining if the current episode 342E is an initial episode of the media content (decision block 606).

In response to determining that the current episode 342E is an initial episode of the media content, method 600 includes tracking the viewing date/time (e.g. viewing date/time 442B) and the viewing time or duration (e.g., viewing duration 442C) of the current episode (block 632) and storing the viewing date/time and viewing duration to system memory 120 (block 634).

In response to determining that the current episode 342E is not an initial episode of the media content, method 600 includes identifying the previous episodes (e.g., episode 1 324B and episode 2 324C) of the media content that have been viewed including the last viewed episode 450 (block 608). Method 600 includes identifying the last viewing date/time 452 of the last viewed episode 450 (block 610).

In an example embodiment, if the current episode 342E selected for playback is episode 3 324D of media content B 324 and episode 1 324B and episode 2 324C have been previously viewed, then the last viewed episode 450 is episode 2 324C and the last viewing date/time 452 is viewing date/time 444B.

Method 600 includes determining a first time difference 316 between a current time 314 and the last previous viewing time 452 of the last episode (block 612). Method 600 includes determining, based on the first time difference 316, at least a first time duration 362B for a video recap A1 362 of at least one of the one or more prior episodes (e.g., episode 1 324B and episode 2 324C or alternatively, just episode 2 324C) of the media content (e.g., media content B 324) (block 614).

At decision block 616, method 600 includes determining if the first time difference 316 is less than a time difference threshold 318. In response to determining that the first time difference 316 is less than the time difference threshold 318, method 600 includes withholding streaming of the first video recap A1 362 to electronic device 100 (block 640) and initiating automatic streaming of the first media content without the first video recap to electronic device 100 (block 642). As an example, if the previous episode of the media content was viewed less than 4 hours before and the threshold is 4 hours, the video computer system 180 determines that the first time difference is not long enough (i.e., less than the threshold of 4 hours) to warrant presenting a video recap.

In response to determining that the first time difference 316 is not less than the time difference threshold 318, method 600 includes retrieving previously viewed episodes (e.g., episode 1 324B and episode 2 324C) of the media content (e.g., media content B 324) from system memory 120 (block 618). Method 600 includes generating the first video recap A1 362 based on at least the more previous one of the one or more prior episodes (e.g., episode 1 324B and episode 2 324C) (block 620). Method 600 includes streaming the first time duration 362B of the first video recap A1 362 (i.e., content 362D) for presentation on electronic device 100 as a preview presented prior to streaming the current episode 342E of the first media content to electronic device 100 (block 622). Following blocks 634, 642, and 622, method 600 ends at end block 650.

With reference to FIG. 7, method 700 begins at the start block 702. At block 704, method 700 includes detecting selection of a current episode 342E (e.g., episode 3 324D) of media content 320 for playback. The media content is presented sequentially within a plurality of episodes comprising one or more prior viewed episodes 440 that precede the current episode 342E that is being initiated for playback. In response to detecting selection of the current episode 342E of the media content for playback, method 700 includes determining if the current episode 342E is an initial episode of the media content (decision block 706).

In response to determining that the current episode 342E is an initial episode of the media content, method 700 includes tracking the viewing date/time (e.g. viewing date/time 442B) and the viewing time or duration (e.g., viewing duration 442C) of the current episode (block 732) and storing the viewing date/time and viewing duration to system memory 120 (block 734).

In response to determining that the current episode 342E is not an initial episode of the media content, method 700 includes identifying the previous episodes (e.g., episode 1 324B and episode 2 324C) of the media content that have been viewed including the last viewed episode 450 (block 708). Method 700 includes identifying the last viewing date/time 452 of the last viewed episode 450 (block 710).

Method 700 includes determining a first time difference 316 between a current time 314 and the last previous viewing time 452 of the last episode (block 712). Method 700 includes determining, based on the first time difference 316, at least a first time duration 362B for a video recap of at least one of the one or more prior episodes (e.g., episode 1 324B and episode 2 324C) of the media content (e.g., media content B 324) (block 714).

At decision block 716, method 700 includes determining if the first time difference 316 is less than a time difference threshold 318. In response to determining that the first time difference 316 is less than the time difference threshold 318, method 700 includes withholding streaming of the first video recap to electronic device 100 (block 740) and initiating automatic streaming of the first media content without the first video recap to electronic device 100 (block 742).

In response to determining that the first time difference 316 is not less than the time difference threshold 318, method 700 includes retrieving from electronic video recap catalog 266 video recap modules 266A having different durations of video recaps for the current episode being queued for playback (block 718). Method 700 includes identifying, from the retrieved video recap modules 266A, a video recap (e.g., video recap A 490) that has the first time duration or difference 316 (e.g., time duration 490B) and that comprises relevant content 490D from at least one of the one or more prior episodes 490C, based on selection criteria that includes the first time difference 316 and the current episode 342E being selected for playback (block 720). Method 700 includes streaming video recap A 490 to electronic device 100 as a preview presented prior to streaming the current episode 342E of the first media content to electronic device 100 (block 722). Following blocks 734, 742, and 722, method 700 ends at end block 750.

With reference to FIG. 8, method 800 begins at the start block 802. At block 804, method 800 includes detecting selection of first media content (e.g., media content video A 322) of media content 320 for initiation of playback at a present viewing time (e.g., current time 314). In one embodiment, the first media content is a single media content and unlike the embodiments of methods 600 and 700, the partially viewed portion is not a completed episode that is part of a multi-episode series. In another embodiment the first media content can be a partially viewed single episode of a multi-episode series. Method 800 includes determining whether the media selected for playback (e.g., media content A 322) is a continuation of a previous playback of a first viewed portion 412 of the first media content from a previous viewing time (decision block 806).

In response to determining that the media selected for playback (e.g., media content A 322) is not a continuation of a previous playback of a first viewed portion 412 of the first media content from a previous viewing time, method 800 includes tracking the last viewing date/time 416 and the elapsed viewing time 416 of the media content selected for playback (block 832) and storing the viewing date/time and elapsed viewing time to system memory 120 (block 834). Method 800 ends at end block 850.

In response to determining that the video selected for playback (e.g., media content A 322) is a continuation of a previous playback of a first viewed portion 412 of the first media content (e.g., media content A 322) from a previous viewing time 416, method 800 includes identifying the last viewing date/time 416 of the video selected for playback (block 808). Method 800 includes determining an elapsed time 418 between the previous or last viewing time 416 and the current or present viewing time 314 of the first media content (e.g., media content A 322) (block 810).

At decision block 812, method 800 includes determining if the elapsed time 418 is less than a time difference threshold 318. In response to determining that elapsed time 418 is less than the time difference threshold 318, method 800 includes withholding streaming of a video recap to electronic device 100 (block 840) and initiating automatic streaming of the remaining portion 414 of media content A 322 without the video recap to electronic device 100 (block 842). Method 800 terminates at end block 850.

In response to determining that elapsed time 418 is not less than the time difference threshold 318, method 800 includes determining a video recap time duration 364B for providing an optimal time length of a video recap B 364 of the first portion 412 of the first media content (e.g., media content A 322) (block 814). The video recap time duration 364B is based on a value of the elapsed time 418. Method 800 includes generating content 364D of video recap B 364 from the viewed portion 412 of media content A 322 (block 816). Video recap B 364 is based on relevant content of the viewed portion 412 of media content A 322 and time duration 364B.

Method 800 includes presenting/streaming video recap B 364 of the viewed portion 412 of the first media content (e.g., media content A 322) to electronic device 100 prior to initiating playback of a remaining portion 414 of the first media content (e.g., media content A 322) (block 818). Method 800 ends at end block 850.

With reference to FIG. 9, method 900 begins at the start block 902. At block 904, method 900 includes detecting selection of first media content (e.g., media content A 322) of media content 320 for initiation of playback at a present viewing time (e.g., current time 314). In one embodiment the first media content is a single media content and, unlike the embodiments of methods 600 and 700, the partially viewed portion is not a completed episode that is part of a multi-episode series. In another embodiment the first media content can be a partially viewed single episode of a multi-episode series. Method 900 includes determining that the video selected for playback (e.g., media content A 322) is a continuation of a previous playback of a first viewed portion 412 of the first media content from a previous viewing time (decision block 906).

In response to determining that the video selected for playback (e.g., media content A 322) is not a continuation of a previous playback of a first viewed portion 412 of the first media content from a previous viewing time, method 900 includes tracking the last viewing date/time 416 and the elapsed viewing time 416 of the media content selected for playback (block 932) and storing the viewing date/time and elapsed viewing time to system memory 120 (block 934). Method 900 ends at end block 950.

In response to determining that the video selected for playback (e.g., media content A 322) is a continuation of a previous playback of a first viewed portion 412 of the first media content (e.g., media content A 322) from a previous viewing time 416, method 900 includes identifying the last viewing date/time 416 of the video selected for playback (block 908). Method 900 includes determining an elapsed time 418 between the previous or last viewing time 416 and the current or present viewing time 314 of the first media content (e.g., media content A 322) (block 910).

At decision block 912, method 900 includes determining if the elapsed time 418 is less than a time difference threshold 318. In response to determining that elapsed time 418 is less than the time difference threshold 318, method 900 includes withholding streaming of a video recap to electronic device 100 (block 940) and initiating automatic streaming of the remaining portion 414 of media content A 322 without the video recap to electronic device 100 (block 942).

In response to determining that elapsed time 418 is not less than the time difference threshold 318, method 900 includes retrieving from electronic video recap catalog 266 video recap modules 266A having different durations of video recaps based on which portion of the video has been viewed and the elapsed time since the viewed portion was viewed (block 914). Method 900 includes identifying a video recap (e.g., video recap C 494), from the retrieved video recap modules 266A, that has the elapsed time 418 (e.g., time duration 494B) and comprising relevant content 494D from the viewed portion 494C, based on selection criteria comprising the elapsed time 418 (block 916). Method 900 includes presenting/streaming video recap C 494 of the viewed portion 412 of the media content (e.g., media content A 322) to electronic device 100 prior to initiating playback of a remaining portion 414 of the media content (block 918). Method 900 ends at end block 950.

The disclosure enables an adaptive video recap system that dynamically adjusts the length and content of a video recap based on a user's viewing history. With a multi-episode series, a video recap is used to bring a viewer up to date with the current events of the plot of a story, so the viewer can understand from where the current episode will begin. For recent viewing of episodes or viewing of consecutive episodes, a short concise video recap can be dynamically generated or selected from an electronic video recap catalog. For viewing of episodes with longer intervals between viewed episodes, a longer, more comprehensive video recap can be dynamically generated or selected from an electronic video recap catalog to bring a viewer up to date with the start of a current episode. The disclosure enables an adaptive video recap system that modifies a video recap to a user's individual viewing pattern to enhance a user experience. The disclosure enables an adaptive video recap system that optimizes the length and content of video recaps to bring a viewer up to date with the start of a current episode. Additionally, with a partially viewed video content, the disclosure provides similar benefits of a dynamically generated video recap that brings a viewer up to date with the events of the previous partially viewed video or single media content based on the viewer's consumption history of the partially viewed video content. The viewer can then understand from where the remaining portion of the single media content will begin.

In the above-described methods of FIGS. 6-9, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A computing system comprising:
a communications subsystem;
a memory having stored thereon an adaptive video recap module for selectively presenting a determined optimal duration of video recap of media content; and
at least one processor communicatively coupled to the communications subsystem and the memory and which executes program code of the adaptive video recap module, the at least one processor configured to cause the computing system to:
detect selection of a current episode of first media content for playback, the first media content presented sequentially within a plurality of episodes comprising one or more prior episodes that precede the current episode being initiated for playback;
in response to detecting selection of the current episode of the first media content for playback, determine a first time difference between a current time and a previous viewing time of the one or more prior episodes;
determine, based on the first time difference, at least a first time duration for a first video recap of at least one of the one or more prior episodes of the first media content; and
stream the first time duration of the first video recap of the first media content for presentation on an electronic device as a preview presented prior to streaming the current episode of the first media content for presentation on the electronic device.

2. The computing system of claim 1, wherein the at least one processor is further configured to cause the computing system to generate the first video recap of the first media content from the one or more prior episodes, the first time duration of the first video recap determined at least in part based on the first time difference.

3. The computing system of claim 1, wherein the at least one processor is further configured to cause the computing system to retrieve from an electronic catalog of different durations of video recap modules, a video recap having the first time duration and comprising relevant content from at least one of the one or more prior episodes, based on selection criteria comprising the first time difference and the current episode being selected for playback.

4. The computing system of claim 1, wherein the at least one processor is configured to:
identify a last viewed episode of the one or more prior episodes of the first media content that has been previously viewed; and
generate the first time duration of the first video recap of the first media content at least partially based on previously viewed one or more episodes of the first media content that have been viewed prior to the last viewed episode.

5. The computing system of claim 1, wherein the at least one processor is configured to:
determine if the current episode of the first media content is an initial episode of the plurality of episodes;
in response to determining that the current episode of the first media content is an initial episode of the plurality of episodes, track a first viewing time duration of the initial episode; and
store the first viewing time duration.

6. The computing system of claim 1, wherein the at least one processor is configured to:
determine if the first time difference is less than a time difference threshold; and
in response to determining that the first time difference is less than the time difference threshold, withhold streaming of the first video recap to the electronic device, and initiates automatic streaming of the first media content without the first video recap.

7. The computing system of claim 1, wherein the at least one processor is configured to:
receive, from the electronic device, a video recap option selection from a user of the electronic device, the video recap option selection including a user selected time duration for the first video recap; and
in response to receiving the video recap option selection, generate the first video recap of the first media content from the one or more prior episodes, a time duration of the first video recap determined at least in part based on the user selected time duration.

8. The computing system of claim 1, wherein the at least one processor is configured to:
receive, from the electronic device, a skip video recap option selection; and
in response to receiving the skip video recap option selection, withhold streaming of the first video recap to the electronic device.

9. The computing system of claim 1, wherein the first media content includes the plurality of episodes that are part of a multi-episode series.

10. A method comprising:
detecting, via at least one processor of a computing system, selection of a current episode of first media content for playback, the first media content presented sequentially within a plurality of episodes comprising one or more prior episodes that precede the current episode being initiated for playback;
in response to detecting selection of the current episode of the first media content for playback, determining a first time difference between a current time and a previous viewing time of the one or more prior episodes;
determining, based on the first time difference, at least a first time duration for a first video recap of at least one of the one or more prior episodes of the first media content; and
streaming the first time duration of the first video recap of the first media content for presentation on an electronic device as a preview presented prior to streaming the current episode of the first media content for presentation on the electronic device.

11. The method of claim 10, further comprising:
generating the first video recap of the first media content from the one or more prior episodes, the first time duration of the first video recap determined at least in part based on the first time difference.

12. The method of claim 10, further comprising:
retrieving from an electronic catalog of different durations of video recap modules, a video recap having the first time duration and comprising relevant content from at least one of the one or more prior episodes, based on selection criteria comprising the first time difference and the current episode being selected for playback.

13. The method of claim 10, further comprising:
identifying a last viewed episode of the one or more prior episodes of the first media content that has been previously viewed; and
generating the first time duration of the first video recap of the first media content at least partially based on previously viewed one or more episodes of the first media content that have been viewed prior to the last viewed episode.

14. The method of claim 10, further comprising:
determining if the current episode of the first media content is an initial episode of the plurality of episodes;
in response to determining that the current episode of the first media content is an initial episode of the plurality of episodes, tracking a first viewing time duration of the initial episode; and
storing the first viewing time duration.

15. The method of claim 10, further comprising:
determining if the first time difference is less than a time difference threshold;
in response to determining that the first time difference is less than the time difference threshold, withholding streaming of the first video recap to the electronic device; and
initiating automatic streaming of the first media content without the first video recap.

16. The method of claim 10, further comprising:
receiving, from the electronic device, a video recap option selection from a user of the electronic device, the video recap option selection including a user selected time duration for the first video recap; and
in response to receiving the video recap option selection, generating the first video recap of the first media content from the one or more prior episodes, the time duration of the first video recap determined at least in part based on the user selected time duration.

17. The method of claim 10, further comprising:
receiving, from the electronic device, a skip video recap option selection; and
in response to receiving the skip video recap option selection, withholding streaming of the first video recap to the electronic device.

18. The method of claim 10, wherein the first media content includes the plurality of episodes that are part of a multi-episode series.

19. A computer program product comprising:
a computer readable storage device having stored thereon program code which, when executed by at least one processor of a computing system having a communications subsystem configures the computing system to complete the functionality of:
detecting selection of a current episode of first media content for playback, the first media content presented sequentially within a plurality of episodes comprising one or more prior episodes that precede the current episode being initiated for playback;

in response to detecting selection of the current episode of the first media content for playback, determining a first time difference between a current time and a previous viewing time of the one or more prior episodes;

determining, based on the first time difference, at least a first time duration for a first video recap of at least one of the one or more prior episodes of the first media content; and streaming the first time duration of the first video recap of the first media content for presentation on an electronic device as a preview presented prior to streaming the current episode of the first media content for presentation on the electronic device.

20. The computer program product of claim 19, wherein the program code further configures the computing system to complete the functionality of:

generating the first video recap of the first media content from the one or more prior episodes, the first time duration of the first video recap determined at least in part based on the first time difference.

\* \* \* \* \*